(12) United States Patent
Thompson et al.

(10) Patent No.: US 10,991,178 B2
(45) Date of Patent: Apr. 27, 2021

(54) SYSTEMS AND METHODS FOR TRAILER SAFETY COMPLIANCE

(71) Applicant: Toyota Motor Engineering & Manufacturing North America, Inc., Plano, TX (US)

(72) Inventors: Derek A. Thompson, Ypsilanti, MI (US); Darin P. Rosekrans, South Lyon, MI (US); Jeffrey E. Pierfelice, Canton, MI (US); Frankie B. Reed, Ypsilanti, MI (US); Stephen L. Robertson, Surprise, AZ (US); John Charles Rafferty, Dexter, MI (US); Clinton John Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 96 days.

(21) Appl. No.: 16/383,029

(22) Filed: Apr. 12, 2019

(65) Prior Publication Data

US 2020/0327748 A1  Oct. 15, 2020

(51) Int. Cl.
   *G07C 5/08*  (2006.01)
   *B60K 28/10*  (2006.01)
   *G07C 5/00*  (2006.01)

(52) U.S. Cl.
   CPC .......... *G07C 5/0825* (2013.01); *B60K 28/10* (2013.01); *G07C 5/008* (2013.01); *G07C 5/0808* (2013.01)

(58) Field of Classification Search
   CPC .... G07C 5/0825; G07C 5/0808; G07C 5/008; B60K 28/10
   See application file for complete search history.

(56) References Cited

U.S. PATENT DOCUMENTS

| | | | | |
|---|---|---|---|---|
| 7,124,003 | B1 * | 10/2006 | West | G01R 31/007 701/32.8 |
| 9,227,568 | B1 | 1/2016 | Hubbell et al. | |
| 9,738,125 | B1 * | 8/2017 | Brickley | B60D 1/26 |
| 10,569,607 | B1 * | 2/2020 | Alalouf | B60D 1/605 |
| 2002/0161495 | A1 * | 10/2002 | Yamaki | G07C 5/008 701/33.8 |
| 2003/0061005 | A1 * | 3/2003 | Manegold | G08G 1/20 702/182 |
| 2006/0238317 | A1 * | 10/2006 | Colledge | B60Q 1/305 340/431 |

(Continued)

*Primary Examiner* — Babar Sarwar
(74) *Attorney, Agent, or Firm* — Christopher G. Darrow; Darrow Mustafa PC

(57) ABSTRACT

In one embodiment, a method for trailer safety is provided. The method includes: receiving a request to perform a trailer safety check, wherein the request is associated with a vehicle and a trailer; in response to the request, providing a trailer safety checklist, wherein the trailer safety checklist includes a plurality of user-interface elements, and at least one of the user-interface elements corresponds to a light component of the trailer; receiving a first signal indicating that an operator has selected the user-interface element corresponding to the light component of the trailer, wherein the operator is located outside of the vehicle; and in response to the first signal, causing the light component of the trailer corresponding to the selected user-interface element to turn on.

20 Claims, 5 Drawing Sheets

(56) References Cited

U.S. PATENT DOCUMENTS

| | | | | |
|---|---|---|---|---|
| 2012/0191285 | A1* | 7/2012 | Woolf | B60D 1/36 701/25 |
| 2014/0210456 | A1* | 7/2014 | Crossman | B60W 30/12 324/207.2 |
| 2014/0253307 | A1* | 9/2014 | Miller | B60D 1/36 340/431 |
| 2015/0204741 | A1* | 7/2015 | Hagan | B60W 10/08 180/11 |
| 2015/0344067 | A1* | 12/2015 | Lavoie | B62D 15/027 701/41 |
| 2017/0116792 | A1 | 4/2017 | Jelinek et al. | |
| 2017/0116795 | A1* | 4/2017 | Andrus | G07C 5/0808 |
| 2018/0061149 | A1* | 3/2018 | Arena | G07C 9/00896 |
| 2018/0080852 | A1* | 3/2018 | Hagan, Jr. | B60D 1/62 |
| 2018/0097884 | A1* | 4/2018 | Terwilliger | H04L 67/24 |
| 2018/0154874 | A1* | 6/2018 | Kulkarni | H01M 4/8814 |
| 2018/0308045 | A1* | 10/2018 | Arena | G07C 9/00182 |
| 2019/0221054 | A1* | 7/2019 | Kumar | G07C 5/008 |
| 2019/0315170 | A1* | 10/2019 | Williams | H04W 4/48 |
| 2020/0001827 | A1* | 1/2020 | Shirazi | G08B 13/19695 |
| 2020/0298757 | A1* | 9/2020 | Thompson | B60Q 11/005 |

* cited by examiner

SYSTEMS AND METHODS FOR TRAILER SAFETY COMPLIANCE

TECHNICAL FIELD

The subject matter described herein relates, in general, to systems and methods for ensuring that a trailer is connected correctly to a vehicle, and, in particular, to providing a mobile application that can be used to test trailer components such as lights while an operator or driver is not in the vehicle.

BACKGROUND

When a trailer is attached to a vehicle, there are certain trailer and vehicle components that the driver of the vehicle should check are functioning correctly before driving with the trailer attached. These may include checking that the trailer is correctly attached to the vehicle, and that the lights of the trailer are functioning correctly. With respect to the lights of the trailer, the driver should verify that the turn signals of the trailer turn on when the corresponding turn signals of the vehicle are activated, and that the brake lights of the trailer turn on when the corresponding brake lights of the vehicle are activated.

Some systems for verifying that a trailer is working currently exist. Typically, these systems provide an electronic checklist of the trailer and vehicle components that the driver should check before driving.

However, there are drawbacks associated with such systems. First, the current verification systems do not prevent the driver of the vehicle from operating the vehicle without first verifying that the trailer components are all functional. Second, these verification systems often require that the driver leave the vehicle to observe the trailer components, and therefore require at least two persons to test certain trailer components.

For example, with respect to light components, to determine if the trailer brake lights are functioning correctly, the driver must first actuate the vehicle brakes, and then must rely on another person to stand behind the trailer and verify that the trailer brake lights turned on as expected. This problem is further exacerbated when it is determined that one of the light components of the trailer is not working correctly, as the driver must continuously enter and exit the vehicle as they attempt to troubleshoot the light components.

SUMMARY

In one embodiment, example systems and methods related to trailer safety are provided. A trailer safety component is integrated into a vehicle. When the trailer safety component detects that a trailer is connected to the vehicle (or after being requested by a driver of the vehicle), the trailer safety component creates a trailer safety checklist that is transmitted and displayed to the driver on a smartphone or other computing device associated with the driver. The checklist includes user-interface elements corresponding to various trailer components that the driver must verify are working correctly. The driver may verify that specific trailer components are working correctly using the checklist. In addition, the checklist may require that the driver provide photographs that show that each component has been inspected. With respect to light components, the checklist may allow the driver to test the light components by pressing or selecting a corresponding user-interface element. In response, the trailer safety component causes the selected light component to turn on, allowing the driver to verify that the particular light component is functioning correctly without having to be inside the vehicle to manually actuate the light component. This allows the driver to complete the checklist without needing a second person. Once the checklist is completed, the checklist can be stored by the trailer safety component for auditing purposes. In addition, in some embodiments, the vehicle may be disabled by the trailer safety component, and may not be operable until the completed checklist is received.

In one embodiment, a system for proving trailer safety is provided. The system includes one or more processor and a memory communicably coupled to the one or more processors. The memory stores a checklist module and a light module. The checklist module including instructions that when executed by the one or more processors cause the one or more processors to: receive a request to perform a trailer safety check, wherein the request is associated with a vehicle and a trailer; and in response to the request, provide a trailer safety checklist, wherein the trailer safety checklist includes a plurality of user-interface elements, and at least one of the user-interface elements corresponds to a light component of the trailer. The light module including instructions that when executed by the one or more processors cause the one or more processors to: receive a first signal indicating that an operator has selected the user-interface element corresponding to the light component of the trailer, wherein the operator is located outside of the vehicle; and in response to the first signal, cause the light component of the trailer corresponding to the selected user-interface element to turn on.

In one embodiment, a method for trailer safety is provided. The method includes: receiving a request to perform a trailer safety
check, wherein the request is associated with a vehicle and a trailer; in response to the request, providing a trailer safety checklist, wherein the trailer safety checklist includes a plurality of user-interface elements, and at least one of the user-interface elements corresponds to a light component of the trailer; receiving a first signal indicating that an operator has selected the user-interface element corresponding to the light component of the trailer, wherein the operator is located outside of the vehicle; and in response to the first signal, causing the light component of the trailer corresponding to the selected user-interface element to turn on.

In one embodiment, a method for trailer safety is provided. The method including: receiving a request to perform a trailer safety check, wherein the request is associated with a vehicle and a trailer; in response to the request, disabling the vehicle and providing a trailer safety checklist to an operator associated with the vehicle, wherein the trailer safety checklist includes a plurality of user-interface elements, and at least one of the user-interface elements corresponds to a light component of the trailer; receiving a first signal indicating that the operator has selected the user-interface element corresponding to the light component of the trailer, wherein the operator is located outside of the vehicle; in response to the first signal, causing the light component of the trailer corresponding to the selected user-interface element to turn on; receiving a second signal indicating that the operator has re-selected the user-interface element corresponding to the light component of the trailer; in response to the second signal, causing the light component of the trailer to turn off; determining that the operator has completed the trailer safety checklist; and in response to the determination, storing a record indicating that the operator completed the trailer safety checklist and allowing the operator to drive the vehicle with the trailer attached to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with trailer safety checklist are provided. When a trailer is attached to a vehicle hitch, a trailer safety system detects the connection, and in response generates and provides a trailer safety checklist to a smartphone or other computing device associated with the driver or operator of the vehicle. The checklist may be displayed by a trailer safety client operating on the computing device (e.g., an app on a smartphone). Alternatively, the driver may request the trailer safety checklist at any time from the trailer safety client.

The trailer safety checklist may be a graphical user-interface with user-interface elements that correspond to each trailer component that is subject to inspection. These components may include tires, the hitch, and light components such as brake lights and turn signals. As the driver checks or inspects each component, the driver may select the corresponding user-interface element to indicate that the component has been inspected and is operating correctly. For light components, the driver may further activate the light components using the corresponding user-interface element. For example, the driver may activate the turn signal of the trailer by pressing the user-interface element corresponding to the turn signal in the checklist. In response, the trailer safety system may activate the turn signal of the vehicle, which if the trailer is attached correctly, may cause the turn signal of the trailer to similarly activate. The driver may then indicate that the turn signal is working correctly using the checklist. After the driver completes the checklist, the checklist may be recorded by the trailer safety system for record keeping or insurance purposes.

The trailer safety system described herein solves many of the problems associated with the prior art. First, because the checklist can be implemented by a smartphone or other portable computing device, the driver may complete the checklist from outside of the vehicle. This reduces the number of persons that are needed to verify that the trailer is working correctly, and does not require any specialized equipment that must be connected to the trailer. Second, the trailer safety system may be configured to disable the vehicle until the checklist has been completed, which may help ensure that the trailer has been inspected.

Figure 1:
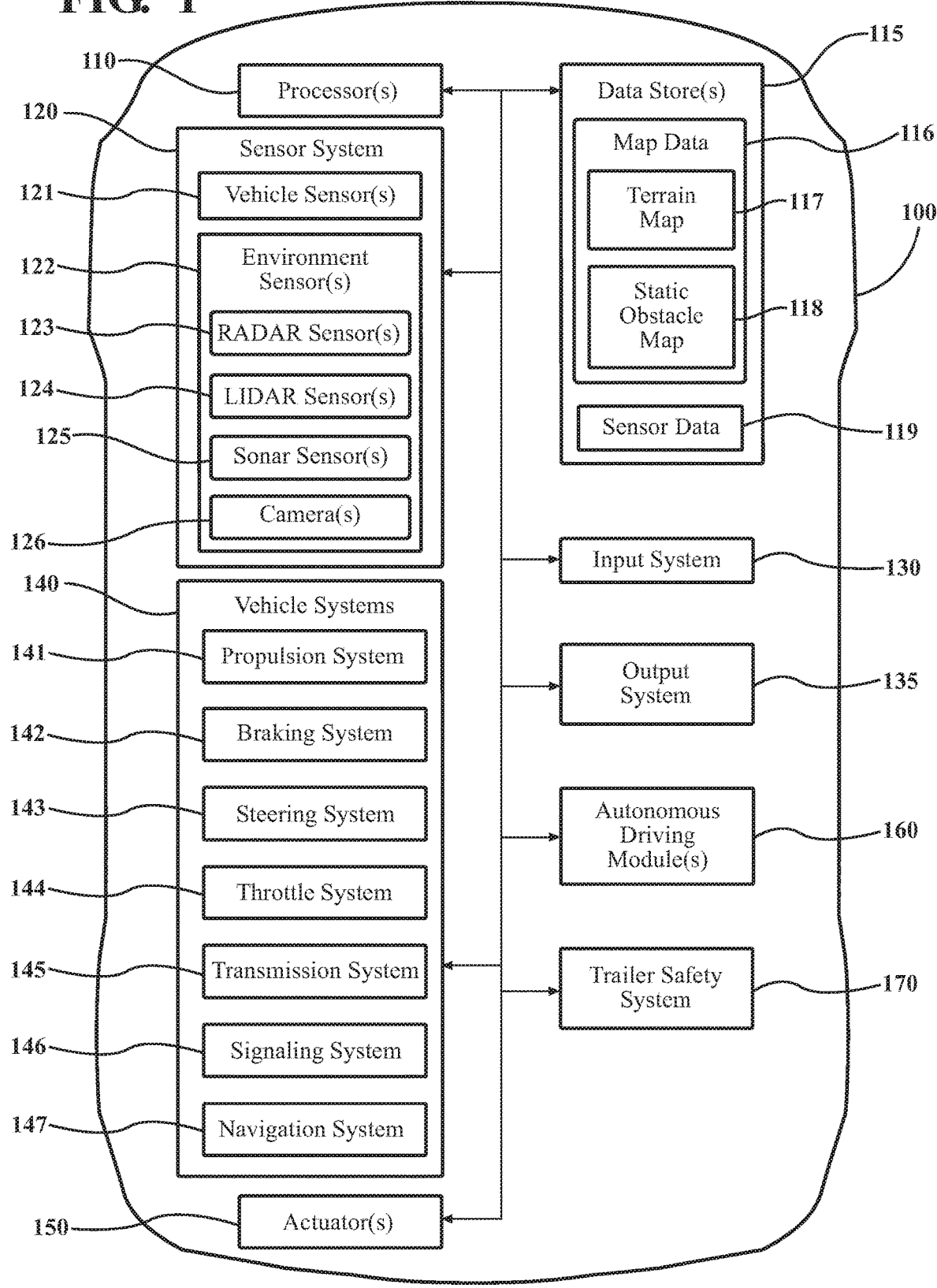
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the trailer safety system 170 that is implemented to test one or more components of a trailer attached to the vehicle 100. The noted functions and methods will become more apparent with a further discussion of the figures.

Figure 2:
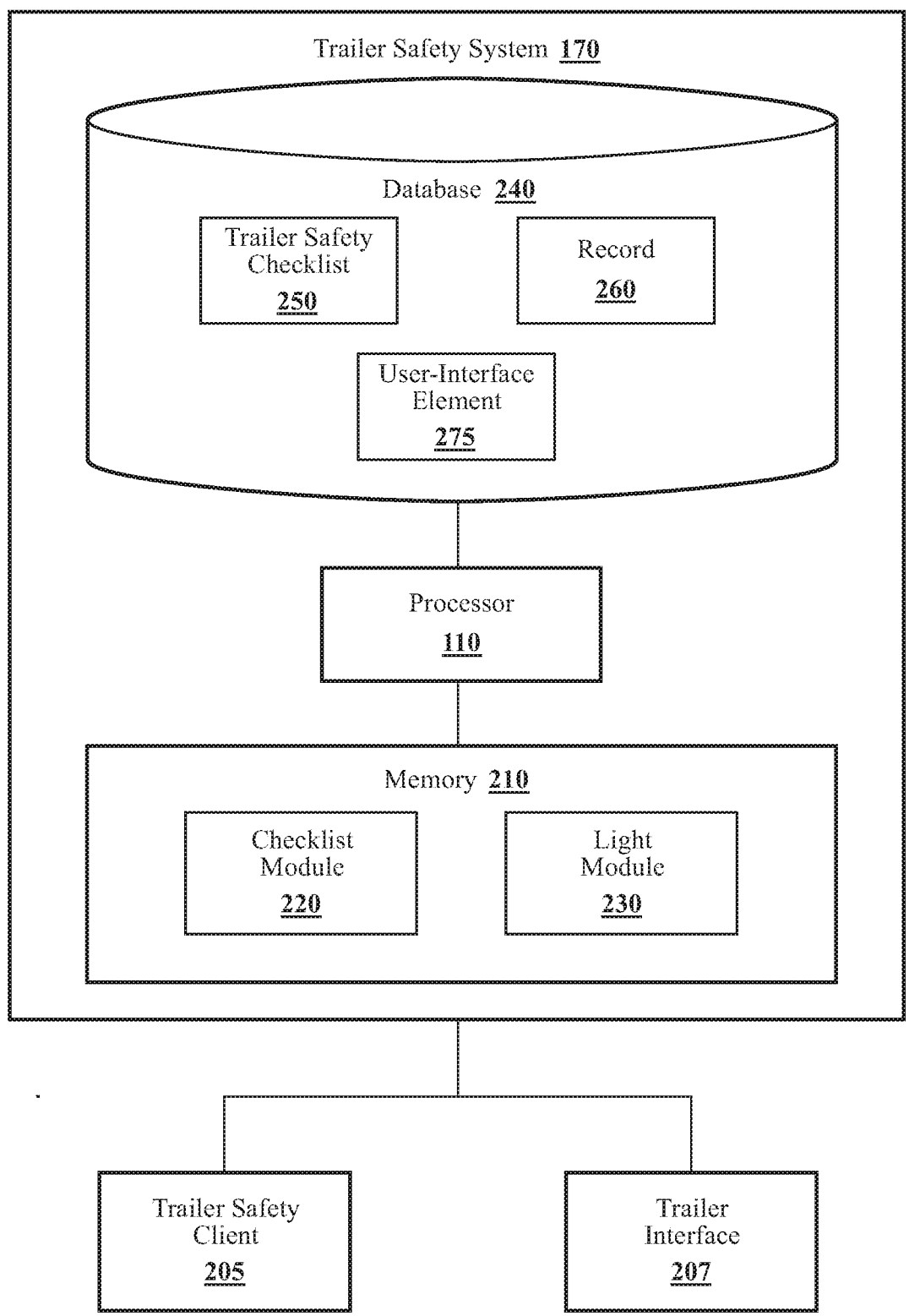
FIG. 2 illustrates one embodiment of a trailer safety system.

With reference to FIG. 2, one embodiment of the trailer safety system 170 of FIG. 1 is further illustrated. The trailer safety system 170 is shown as including a processor 110 from the vehicle 100 of FIG. 1. Accordingly, the processor 110 may be a part of the trailer safety system 170, the trailer safety system 170 may include a separate processor from the processor 110 of the vehicle 100, or the trailer safety system 170 may access the processor 110 through a data bus or another communication path. It should be appreciated, that while the trailer safety system 170 is illustrated as being a single contained system, in various embodiments, the trailer safety system 170 is a distributed system that is comprised of components that can be provided as a centralized server, a cloud-based service, and so on.

In one embodiment, the trailer safety system 170 includes a memory 210 that stores a checklist module 220 and a light module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, as previously noted, in various embodiments, one or more aspects of the trailer safety system 170 are implemented as cloud-based services, and so on. Thus, one or more modules of the trailer safety system 170 may be located remotely from other components and may be implemented in a distributed manner.

Furthermore, in one embodiment, the trailer safety system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes a trailer safety checklist 250 along with, for example, other information that is used and/or generated by the modules 220 and 230 such as one or more user-interface elements 275 and one or more records 260. Of course, in further embodiments, the various information may be stored within the memory 210 or another suitable location.

The checklist module 220 may be configured to generate a trailer safety checklist 250. In some embodiments, a trailer safety checklist 250 may be graphical user-interface ("GUI") that includes a user-interface element 275 corresponding to each step that should be performed by the driver of a vehicle 100 after connecting a trailer. These steps include, but are not limited to, checking the hitch connection, checking the wire harness, checking the air pressure of the trailer tires, checking the brake lights of trailer, checking the turn signal lights of the trailer. More or fewer steps may be included in the trailer safety checklist 250.

The checklist module 220 may be configured to provide the generated trailer safety checklist 250 to a trailer safety client 205. The trailer safety client 205 may be an app executed by a smartphone, or other computing device, associated with the driver or operator of the vehicle 100. The trailer safety client 205 may then display the trailer safety checklist 250 to the driver on their smartphone.

In some embodiments, the checklist module 220 may generate a trailer safety checklist 250 in response to determining that a trailer has attached to the vehicle 100. For example, the checklist module 220 may receive a signal through a trailer interface 207 that connects the vehicle 100 and the trailer. Depending on the embodiment, the trailer interface 207 may be part of the trailer and may connect to the vehicle 100 via a standard 7 pin connector. Other types of connectors may be used.

Alternatively or additionally, the checklist module 220 may determine that a trailer has been connected to the vehicle 100 using one or more sensors 121 associated with the vehicle 100. For example, a camera, or other sensor 121 of the vehicle 100 directed at the hitch, may determine that a trailer has connected to the hitch associated with the vehicle 100.

In some embodiments, the checklist module 220 may generate the trailer safety checklist 250 automatically, and without driver intervention, upon detecting that the vehicle 100 has connected to a trailer. For example, after the trailer is connected to the vehicle 100, the checklist module 220 may generate the trailer safety checklist 250, and may provide the generated checklist to the trailer safety client 205 associated with the driver of the vehicle 100. The checklist module 220 may provide the trailer safety checklist 250 through a wireless networking connection between the trailer safety client 205 and the vehicle 100. Suitable wireless technologies include Wi-Fi and Bluetooth, for example. In some embodiments, the checklist module 220 may provide the trailer safety checklist 250 through a cloud-based system that indirectly connects the trailer safety client 205 and the vehicle 100.

Alternatively or additionally, the checklist module 220 may generate and provide a trailer safety checklist 250 when requested by the driver of the vehicle 100 through the trailer safety client 205. Depending on the embodiment, the driver may use the trailer safety client 205 to request a trailer safety checklist 250 after connecting a trailer to the vehicle 100 or periodically whenever desired. For example, a driver of the vehicle 100 may request a trailer safety checklist 250 after driving some number of miles or after an incident that may affect the trailer such as being in an accident.

As described above, the trailer safety checklist 250 may include a plurality of user-interface elements 275, with each user-interface element 275 corresponding to particular component of the trailer that should be checked or inspected by the driver or operator before driving the vehicle 100 with the trailer attached. Depending on the embodiment, the user-interface elements 275 may include checkboxes, or other selectable elements, that the driver may use to indicate that the associated trailer component was inspected. For example, the user-interface element 275 labeled "check tire air pressure" may have a checkbox that the driver can check to verify that the driver checked the air pressure of each tire.

In addition, in some implementations, some or all of the user-interface elements 275 may allow the driver to provide a photo as evidence that the driver has inspected the particular component. Continuing the example above, after the driver indicates that they checked the tire air pressure, the trailer safety checklist 250 may open a camera application associated with the smartphone or computing device of the driver. The driver may then be prompted to take a photo of the tire as evidence that the driver checked the tire air pressure. The photo may then be associated with the trailer safety checklist 250.

Whether or not a photo is required for a particular trailer safety checklist 250 element may be set by a user or administrator. Where the vehicle 100 is a commercial vehicle, a company associated with the vehicle 100 may require photos for insurance reasons or to maximize driver and public safety. In contrast, where the vehicle 100 is non-commercial vehicle 100 that rarely uses a trailer, requiring photos may lead to driver frustration and may not be necessary.

After the driver completes the trailer safety checklist 250 on their trailer safety client 205, the trailer safety client 205 may transmit the completed checklist 250 to the checklist module 220. The checklist module 220 may then store the completed trailer safety checklist 250 as a record 260. Depending on the embodiment, the record 260 may include the trailer safety checklist 250 along with other information such as a time stamp related to when the trailer safety checklist 250 was completed, an identifier of the vehicle 100, an identifier of the driver or operator, a current location of the vehicle 100 or driver, and other information such as any photos provided by the driver.

Depending on the embodiment, the records 260 may be stored on the vehicle 100 and/or provided to a remote database or server for storage. As may be appreciated, the records 260 may serve as evidence that the driver completed a trailer safety checklist 250 in the event of an accident. Furthermore, insurance companies or businesses associated with the driver of the vehicle 100 may periodically audit the records 260 to verify that the driver is regularly completing the trailer safety checklist 250 when using a trailer.

In some embodiments, after providing the trailer safety checklist 250 to the trailer safety client 205, the checklist module 220 may further disable the vehicle 100 such that the vehicle 100 cannot be driven by the driver until either the trailer safety checklist 250 is completed, or the trailer is removed from the vehicle 100. In these embodiments once the trailer safety checklist 250 is received the checklist module 220 may enable the vehicle 100 so that the driver may operate the vehicle 100 with the attached trailer. Any method for disabling/disabling a vehicle 100 may be used. For example, the checklist module 220 may disable the vehicle 100 through communications with the various vehicle systems 140.

The trailer safety checklist 250 may further include user-interface elements 275 corresponding to one or more light components of the trailer. The light components may include turn signal lights, brake lights, end lights, and a trailer lamp. Other light components may be supported or included in the trailer safety checklist 250.

The light module 230 may allow the driver or operator to control and test one or more of the light components of the trailer through the trailer safety checklist 250 using the trailer safety client 205. When the user selects or otherwise activates a user-interface element 275 corresponding to a light component, the trailer safety client 205 may provide a signal to the light module 230 that identifies the selected light component. Upon receipt of the signal, the light module 230 may cause the vehicle 100 to activate the vehicle light component that corresponds to the light component of the trailer. Because the vehicle 100 and the trailer are connected via the trailer interface 207, activating the vehicle light component will cause the corresponding trailer light component to also activate.

For example, the driver may select a user-interface element 275 corresponding to the brake lights of the trailer. In response, the trailer safety client 205 may generate signal that is received by the light module 230 that identifies the brake lights. In response, the light module 230 may cause the vehicle 100 to activate its brake lights, which causes the brake lights of the trailer to also activate via signals received through the trailer interface 207.

When the driver activates a light component, the light module 230 may cause the selected light component to behave in a predetermined manner. For example, the selected light component may flash or blink some number of times (e.g., three). In another example, the light component may turn on for some predetermined amount of time (e.g., five seconds). In still another example, the light component may be turned on (or caused to blink) until an indication is received from the driver that the light component should be turned off. The particular behavior of each light component may be set by a user or administrator.

As may be appreciated, the light module 230 as described herein provides many advantages over the prior art. First, because the light module 230 can be used to active light components of the trailer using a trailer safety client 205, the driver or operator of the vehicle does not have to be in the vehicle 100 in order to activate the light components. This allows single operator to both activate the light components and verify that they function as expected.

Second, the light module 230 may allow the operator to quickly diagnose and repair a malfunctioning light component. For example, if the operator determines that a brake light of the trailer is not working, the operator may begin trying to fix the brake light by checking connections of the trailer interface 207, by changing a bulb of the brake light, or by changing wiring or fuses associated with the vehicle 100 and/or the trailer. After the operator makes a change, or completes a step towards fixing the brake light, the operator may use the light module 230 (via the trailer safety client 205) to test the brake light. As may be appreciated, by allowing the operator to test the brake lights periodically without having to enter the vehicle 100 at each step, the time associated with repairing the brake lights is reduced and may require fewer operators than traditional methods.

Figure 3:
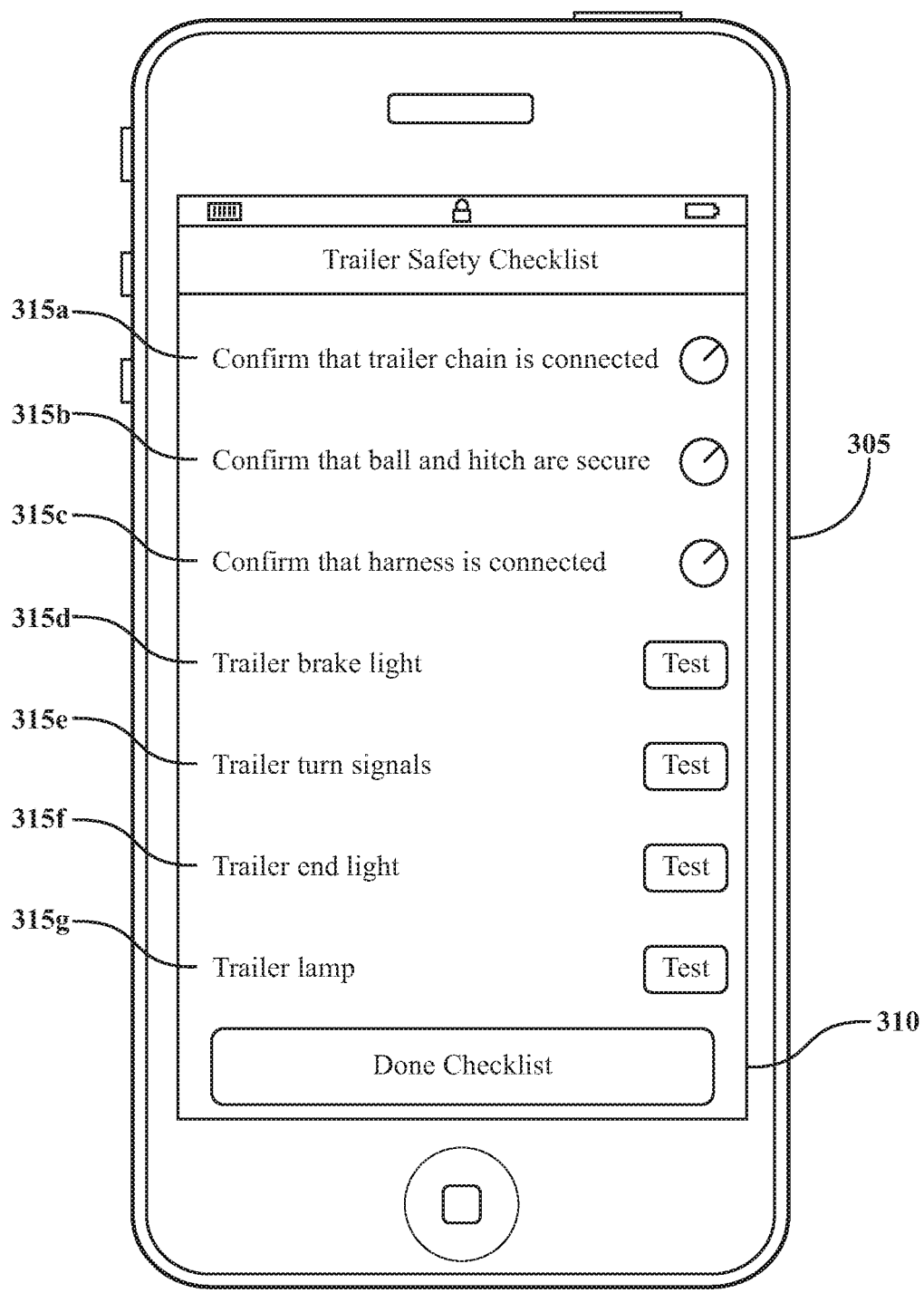
FIG. 3 is an illustration of an example trailer safety checklist.

FIG. 3 is an illustration of an example trailer safety checklist 310. The trailer safety checklist 310 is displayed by a trailer safety client 205 executing on a smartphone 305 associated with the driver or operator of a vehicle 100. The trailer safety checklist 310 includes several user-interface elements 315 (i.e., the user-interface elements 315*a-g*).

In the example shown, the user-interface elements 315*a-c* correspond to trailer components that should be inspected by the driver or operator of the vehicle 100. The user-interface element 315*a* corresponds to inspecting the trailer chain and includes the text "Confirm the trailer safety chain is connected." The user-interface element 315*b* corresponds to inspecting the trailer hitch and includes the text "Confirm that the ball and hitch are secure." The user-interface element 315*c* corresponds to inspecting the trailer harness and includes the text "Confirm that harness is connected."

In the example shown, each of the user-interface elements 315*a-c* is displayed with an adjacent graphic indicating that the driver or operator has inspected the associated trailer component. For example, after the driver or operator clicks or selects a user-interface element 315, an associated graphic (e.g., a star, checkmark, or dot) is displayed adjacent to the user-interface element 315.

The trailer safety checklist 310 further includes user-interface elements 315*d-g* corresponding to light components of the trailer that should be tested by the driver or operator. The user-interface element 315*d* corresponds to the brake lights and includes the text "Trailer brake light." The user-interface element 315*e* corresponds to the turn signals and includes the text "Trailer turn signal." The user-interface element 315*f* corresponds to the trailer end light and includes the text "Trailer end light." The user-interface element 315*g* corresponds to the trailer lamp and includes the text "Trailer lamp."

In the example shown, each of the user-interface elements 315*d-g* is displayed with an adjacent box labeled "Test" that the driver or operator can touch or select to test the corresponding lighting component. For example, after the driver or operator clicks or selects the text box adjacent to the user-interface element 315*d*, the trailer brake light may be caused to turn on by the light module 230. After being selected, each test button may be shaded or colored to indicate that the corresponding light component was tested by the driver or operator.

The trailer safety checklist 310 of FIG. 3 further includes a user-interface element labeled "Done Checking" that the driver or operator may use to indicate that they have completed the trailer safety checklist 310. Depending on the embodiment, the user-interface element may be greyed or otherwise made unavailable for the driver or operator to select until they have touched or selected each of the previous user-interface elements 315*a*-315*g* indicating that the driver or operator has inspected each of the corresponding components of the trailer.

Figure 4:
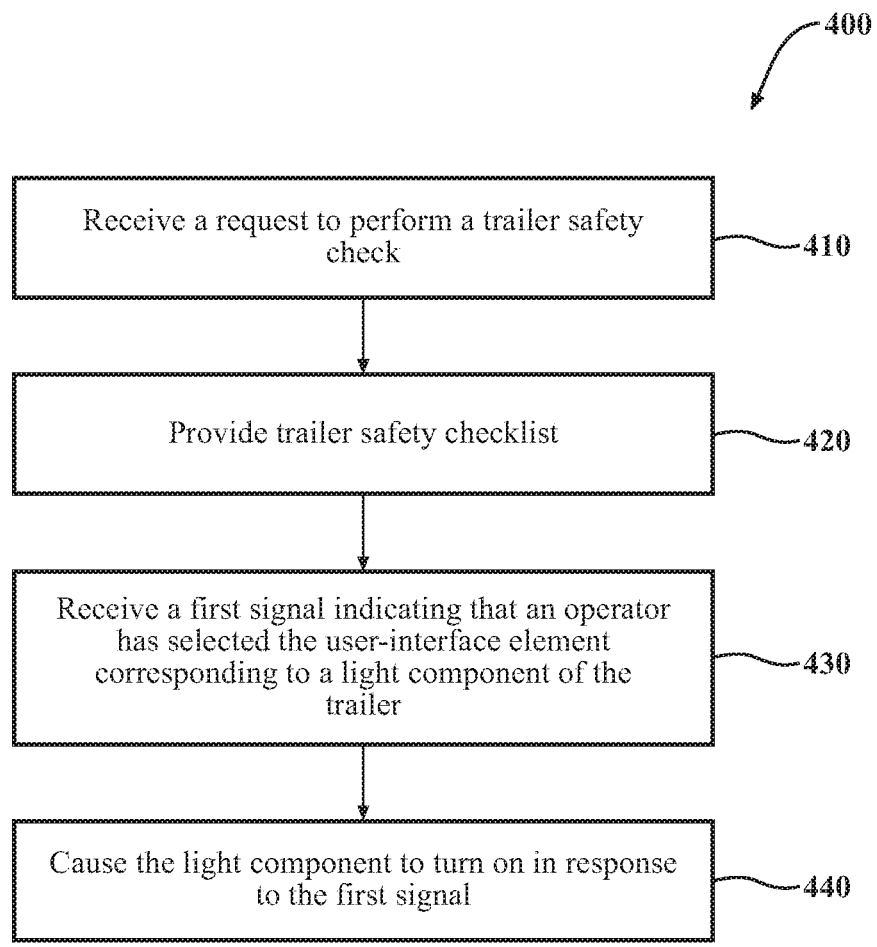
FIG. 4 illustrates a flowchart of a method that is associated with testing one or more light components of a trailer using a trailer safety checklist.

Additional aspects of trailer safety checklists will be discussed in relation to FIG. 4. FIG. 4 illustrates a flowchart of a method 400 that is associated with testing one or more light components of a trailer using a trailer safety checklist. The method 400 will be discussed from the perspective of the trailer safety system 170 of FIGS. 1 and 2. While the method 400 is discussed in combination with the trailer safety system 170, it should be appreciated that the method 400 is not limited to being implemented within the trailer safety system 170 but is instead one example of a system that may implement the method 400.

At 410, the checklist module 220 receives a request to perform a trailer safety check. The request may be associated with a vehicle 100 and a trailer. In some embodiments, the request may have been generated automatically in response to the trailer being connected to the vehicle 100, after some period of time has passed since the last trailer safety check was performed, or in response to an event such as an accident or the trailer having been driven more than a threshold number of miles.

In another embodiment, the request may be generated by a trailer safety client 205. For example, a driver or operator of the vehicle 100 with the attached trailer may desire to perform another trailer safety check, and may use the trailer safety client 205 to generate the request.

At 420, the checklist module 220 provides a trailer safety checklist. The checklist module 220 may provide the trailer safety checklist 250 to the trailer safety client 205 associated with the driver or operator of the vehicle 100. The trailer safety client 205 may be executed by a smartphone, or other computing device, associated with the driver or operator. The trailer safety checklist 250 may be displayed to the driver or operator by the trailer safety client 205 on a display associated with the smartphone associated with the driver or operator of the vehicle 100.

In some embodiments, the trailer safety checklist 250 may include a plurality of user-interface elements 275, and each user-interface element 275 may correspond to a component of the trailer that may be inspected as part of completing the trailer safety checklist 250. In addition, one or more of the components of the trailer may be light components. The light components may include tail lights, brake lights, turn signals, and any other type of light that may be associated with a trailer.

At 430, the checklist module 220 receives a first signal. The checklist module 220 may receive the first signal from the trailer safety client 205 in response to the driver or operator selecting or touching a user-interface element 275 of the trailer safety checklist 250. In some embodiments, the selected user-interface element 275 may correspond to a light component of the trailer.

At 440, the light module 230 causes the selected light component to turn on in response to the first signal. In response to the first signal, the checklist module 220 may transmit the first signal to the light module 230. The light module 230 may cause the light component to turn on by causing the vehicle 100 to turn on a light component of the vehicle 100 that corresponds to the light component selected by the driver or operator using the trailer safety checklist. In response, the light component of the trailer may be caused to turn on via the trailer interface 207.

In some embodiments, the light module 230 may keep the light component turned on until a second signal is received indicating that the driver or operator has re-selected or touched the user-interface element 275 corresponding to the light component. Alternatively or additionally, the light component may remain on for some predetermined amount of time and then may turn off.

Figure 5:
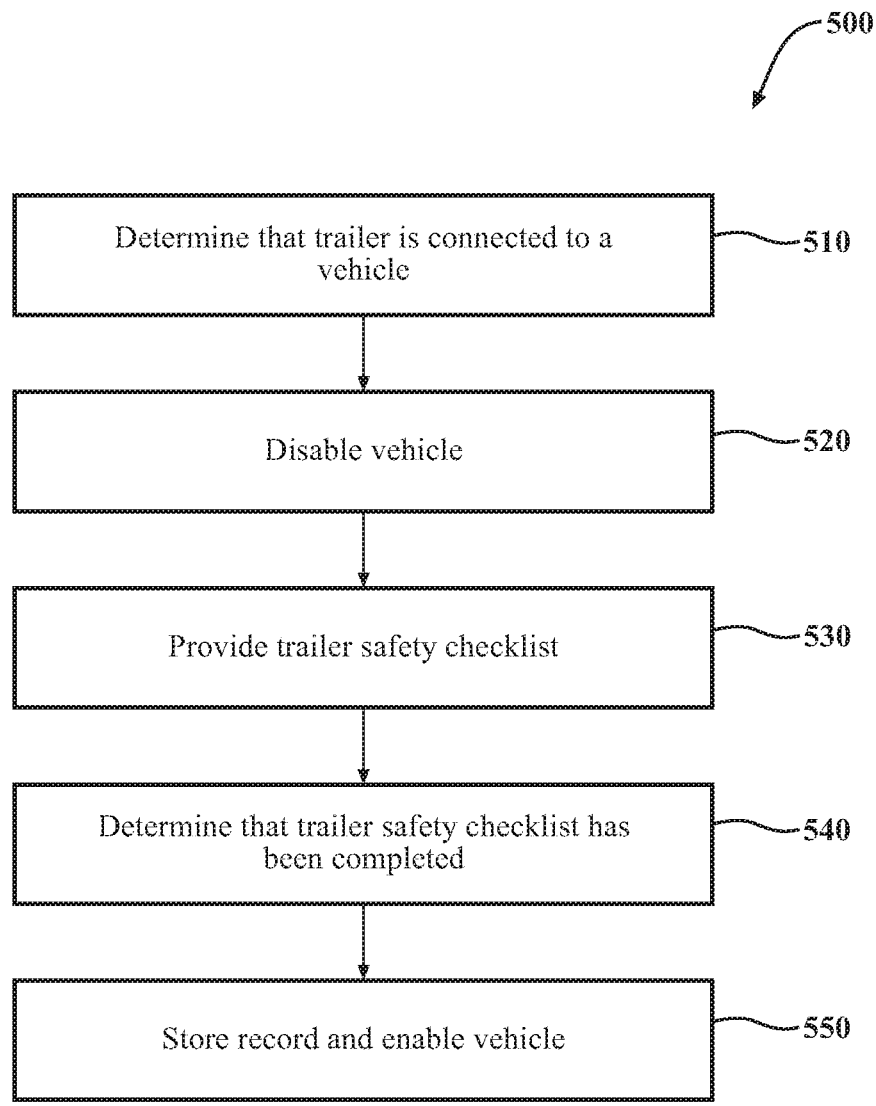
FIG. 5 illustrates a flowchart of a method that is associated with generating a trailer safety checklist and for verifying that the trailer safety checklist has been completed.

Additional aspects of trailer safety checklists will be discussed in relation to FIG. 5. FIG. 5 illustrates a flowchart of a method 500 that is associated with generating a trailer safety checklist and for verifying that the trailer safety checklist has been completed. The method 500 will be discussed from the perspective of the trailer safety system 170 of FIGS. 1 and 2. While the method 500 is discussed in combination with the trailer safety system 170, it should be appreciated that the method 500 is not limited to being implemented within the trailer safety system 170 but is instead one example of a system that may implement the method 500.

At 510, the checklist module 220 determines that a trailer is connected to a vehicle. In some embodiments, the checklist module 220 may determine that the trailer is connected to a vehicle 100 based on information received from one or more vehicle sensors 121. For example, the vehicle 100 may have a camera, or other sensor, that is focused on the hitch of the vehicle 100 that may detect when a trailer is connected to the hitch. In another embodiment, the checklist module 220 may detect an electrical connection between the vehicle 100 and the trailer. For example, the checklist module 220 may detect that the 7 pin connector associated with the trailer has been connected to the vehicle 100. In yet another embodiment, the driver or operator of the vehicle 100 may use the trailer safety client 205 to manually send an indication to the checklist module 220 that the trailer has been connected to the vehicle 100. Other methods for determining that a trailer has been connected to a vehicle 100 may be used.

At 520, the checklist module 220 disables the vehicle. The checklist module 220 may disable the vehicle 100 in response to determining that the trailer is connected to the vehicle 100. The vehicle 100 may remain disabled until the checklist module 220 determines that the trailer safety checklist 250 has been completed by the driver or operator of the vehicle 100. In some embodiments, the checklist module 220 may disable the vehicle 100 by sending a message to, or otherwise interfacing with, the vehicle systems 140. For example, the checklist module 220 may send a message to the throttle system 145 and/or the propulsion system 141 of the vehicle systems 140 to not allow the vehicle 100 to move.

At 530, the checklist module 220 provides the trailer safety checklist. The checklist module 220 may provide the trailer safety checklist 250 to the trailer safety client 205 associated with the driver or operator of the vehicle 100. The trailer safety checklist 250 may include a plurality of user-interface elements 275 corresponding to trailer components that should be inspected by the driver or operator of the vehicle 100 before driving the vehicle 100 with the trailer attached. After inspecting a trailer component, the driver or operator of the vehicle 100 may press or touch the corresponding user-interface element 275 to indicate that it has been inspected. After the driver or operator has inspected each component of the trailer (and touched or pressed the corresponding user-interface elements 275), the completed trailer safety checklist 250 (or an indication of its completion) may be provided to the checklist module 220 by the trailer safety client 205.

At 540, the checklist module 220 determines that the trailer safety checklist has been completed. The checklist module 220 may determine that the trailer safety checklist 250 has been completed in response to receiving the completed checklist 250 (or indication of completion) from the trailer safety client 205.

At 550, the checklist module 220 stores a record and enables the vehicle. The checklist module 220 may store the record 260 in the database 240 of the vehicle 100. Alternatively or additionally, the record 260 may be stored externally to the vehicle 100 (e.g., in a cloud-based computing environment). The record 260 may include information such as the trailer components from the trailer safety checklist 250, the current time or date, an identifier of the driver or operator that completed the trailer safety checklist, and a current location of the vehicle 100. Other information may be included. After the storing the record 260, the checklist module 220 may cause the vehicle 100 to be enabled.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s)

115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trailer safety system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trailer safety system 170, and/or the autonomous driving module(s) 160 may control some or all of these vehicle systems 140 and, thus, may be partially or fully autonomous.

The processor(s) 110, the trailer safety system 170, and/or the autonomous driving module(s) 160 can be operatively connected to communicate with the various vehicle systems 140 and/or individual components thereof. For example, returning to FIG. 1, the processor(s) 110, the trailer safety system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trailer safety system 170, and/or the autonomous driving module(s) 160 may control some or all of these vehicle systems 140.

The processor(s) 110, the trailer safety system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trailer safety system 170, and/or the autonomous driving module(s) 160 can control the direction and/or speed of the vehicle 100. The processor(s) 110, the trailer safety system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trailer safety system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for proving trailer safety comprising:
one or more processors;
a memory communicably coupled to the one or more processors and storing:
a checklist module including instructions that when executed by the one or more processors cause the one or more processors to:
receive, from a computing device associated with an operator of a vehicle and separate from the vehicle, a request to perform a trailer safety check, wherein the request is associated with the vehicle and a trailer; and
in response to the request, provide a trailer safety checklist, wherein the trailer safety checklist includes a plurality of user-interface elements, and at least one of the user-interface elements corresponds to a light component of the trailer; and
a light module including instructions that when executed by the one or more processors cause the one or more processors to:
receive a first signal from the computing device when it is located outside the vehicle, the first signal indicating that the operator has selected the user-interface element corresponding to the light component of the trailer and is operable to activate a component inside the vehicle that corresponds to the light component of the trailer; and
in response to the first signal, cause the light component of the trailer corresponding to the selected user-interface element to turn on.

2. The system of claim 1, wherein the light component of the trailer comprises one or more of a brake light, a turn signal, tail light, and a trailer light.

3. The system of claim 1, wherein the light module further includes instructions that when executed by the one or more processors cause the one or more processors to cause the light component of the trailer to turn off after a period of time.

4. The system of claim 1, wherein the light module further includes instructions that when executed by the one or more processors cause the one or more processors to:
receive a second signal indicating that the operator has re-selected the user-interface element corresponding to the light component of the trailer; and
in response to the second signal, cause the light component of the trailer to turn off.

5. The system of claim 1, wherein the checklist module further includes instructions that when executed by the one or more processors cause the one or more processors to:
determine that the operator has completed the trailer safety checklist; and
in response to the determination, store a record indicating that the operator has completed the trailer safety checklist.

6. The system of claim 5, wherein the checklist module further includes instructions that when executed by the one or more processors cause the one or more processors to:
in response to the determination, allow the operator to drive the vehicle with the trailer attached to the vehicle.

7. The system of claim 1, wherein the checklist module further includes instructions that when executed by the one or more processors cause the one or more processors to display the trailer safety checklist and the user-interface elements on the computing device associated with the operator.

8. The system of claim 1, wherein the request to perform the trailer safety check is generated by the vehicle in response to the vehicle detecting the trailer.

9. The system of claim 1, wherein the checklist module further includes instructions that when executed by the one or more processors cause the one or more processors to disable the vehicle until the trailer safety checklist is completed.

10. A method for trailer safety comprising:
  receiving, from a computing device associated with an operator of a vehicle and separate from the vehicle, a request to perform a trailer safety check, wherein the request is associated with the vehicle and a trailer;
  in response to the request, providing a trailer safety checklist, wherein the trailer safety checklist includes a plurality of user-interface elements, and at least one of the user-interface elements corresponds to a light component of the trailer;
  receiving a first signal from the computing device when it is located outside the vehicle, the first signal indicating that the operator has selected the user-interface element corresponding to the light component of the trailer and is operable to activate a component inside the vehicle that corresponds to the light component of the trailer; and
  in response to the first signal, causing the light component of the trailer corresponding to the selected user-interface element to turn on.

11. The method of claim 10, wherein the light component of the trailer comprises one or more of a brake light, a turn signal, and a trailer light.

12. The method of claim 10, further comprising causing the light component of the trailer to turn off after a period of time.

13. The method of claim 10, further comprising:
  receiving a second signal indicating that the operator has re-selected the user-interface element corresponding to the light component of the trailer; and
  in response to the second signal, causing the light component of the trailer to turn off.

14. The method of claim 10, further comprising:
  determining that the operator has completed the trailer safety checklist; and
  in response to the determination, storing a record indicating that the operator completed the trailer safety checklist.

15. The method of claim 10, further comprising:
  in response to the determination, allowing the operator to drive the vehicle with the trailer attached to the vehicle.

16. The method of claim 10, further comprising displaying the trailer safety checklist and the user-interface elements on the computing device associated with the operator.

17. The method of claim 16, wherein the computing device is a smartphone, computer, laptop, or tablet.

18. The method of claim 10, wherein the request to perform the trailer safety check is generated by the vehicle in response to the vehicle detecting the trailer.

19. The method of claim 10, further comprising disabling the vehicle until the trailer safety checklist is completed.

20. A method for trailer safety comprising: receiving, from a computing device associated with an operator of a vehicle and separate from the vehicle, a request to perform a trailer safety check, wherein the request is associated with the vehicle and a trailer; in response to the request, disabling the vehicle and providing a trailer safety checklist to the operator associated with the vehicle, wherein the trailer safety checklist includes a plurality of user-interface elements, and at least one of the user-interface elements corresponds to a light component of the trailer; receiving a first signal from the computing device when it is located outside the vehicle, the first signal indicating that the operator has selected the user-interface element corresponding to the light component of the trailer and is operable to activate a component inside the vehicle that corresponds to the light component of the trailer; in response to the first signal, causing the light component of the trailer corresponding to the selected user-interface element to turn on; receiving a second signal indicating that the operator has re-selected the user-interface element corresponding to the light component of the trailer; in response to the second signal, causing the light component of the trailer to turn off; determining that the operator has completed the trailer safety checklist; and in response to the determination, storing a record indicating that the operator completed the trailer safety checklist and allowing the operator to drive the vehicle with the trailer attached to the vehicle.

* * * * *